Patented Nov. 5, 1946

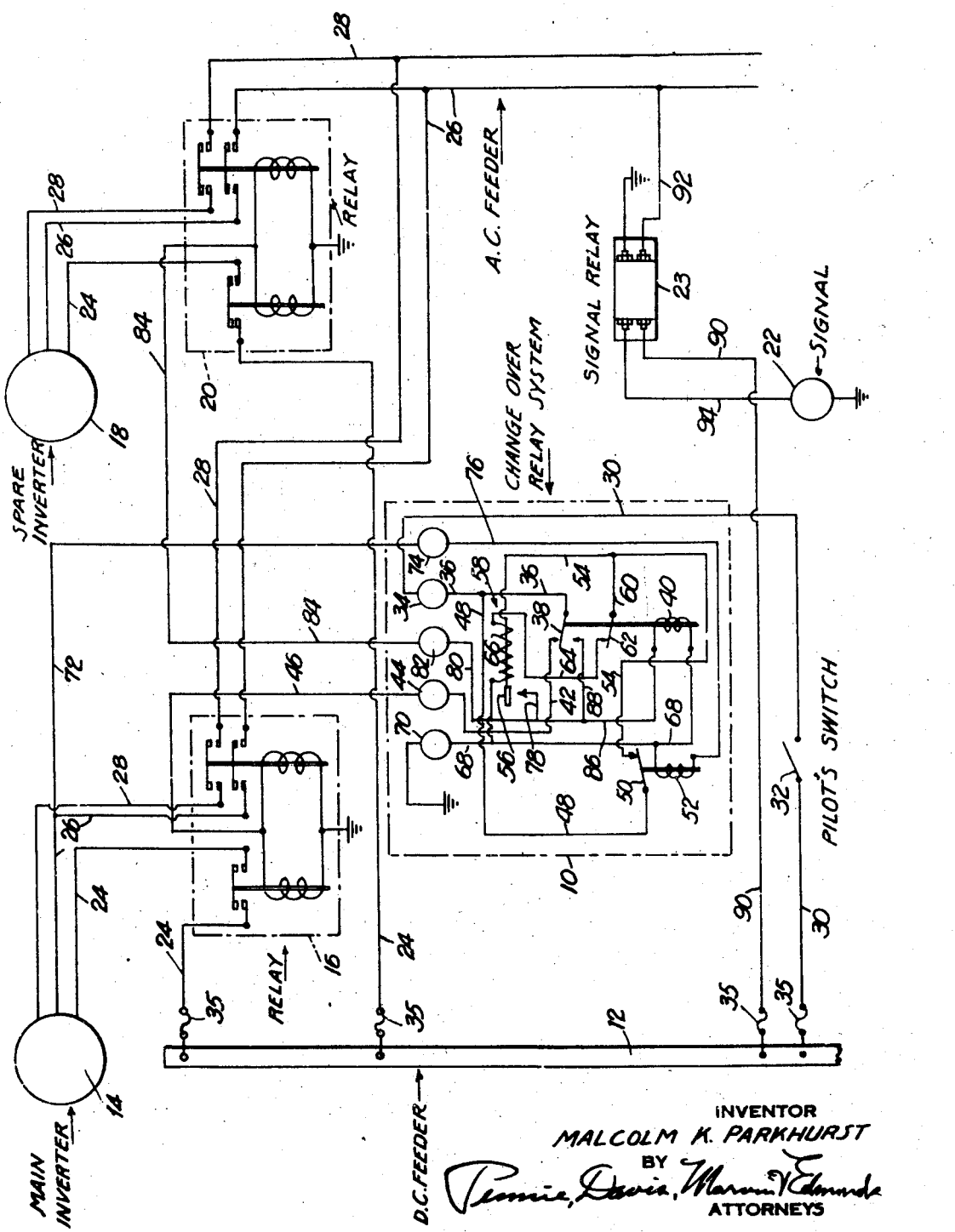

2,410,678

UNITED STATES PATENT OFFICE 2,410,678

CONTROL INVERTER CHANGE-OVER SYSTEM

Malcolm K. Parkhurst, New York, N. Y., assignor to The Wilcolator Company, Elizabeth, N. J., a corporation of Delaware Application August 21, 1945, Serial No. 611,783

6 Claims. (Cl. 171—97)

1

The present invention relates to improvements in automatic relays for insuring a supply of alternating current in systems including a main inverter or generator and a spare inverter or generator which is put in operation upon the failure to the main inverter.

With respect to all common subject matter, the present application is a continuation-in-part of the applicant's application Serial No. 575,663, filed February 1, 1945, for "Automatic change-over relay."

The application referred to points out the fact that certain heavy aircraft are equipped with a main inverter and a spare inverter for producing alternating current for electrical circuits used in the control of superchargers and other equipment aboard the aircraft, such circuits employing 115 volt, 400 cycle alternating current. The inverter used to produce this current is a motor generator set comprising a direct current motor coupled to a 115 volt alternating current generator.

The application referred to discloses an automatic change-over relay system for immediately initiating the operation of the spare inverter upon the failure of the main inverter. This system, according to the application, includes an alternating current relay with a normally closed and normally open contact, a direct current relay with the combination of a normally open and a normally closed contact, and a separate normally closed and a normally open contact, a time-delay relay, means for supplying direct current through the D. C. relay for starting the main inverter, means for supplying direct current to the time-delay relay, means for supplying alternating current from the main inverter as soon as it is in operation, to energize the A. C. relay and thereby form a normally closed contact, means for energizing the D. C. relay from the time-delay relay, and means for passing direct current through the energized D. C. relay for immediately initiating the operation of the spare inverter when the A. C. relay is de-energized upon the failure of the main inverter. The application discloses other features, such as the use of a heater-operated time-delay relay, and means for maintaining the D. C. relay energized independent of the time-delay relay, and for de-energizing the heater-operated relay upon initially energizing the D. C. relay.

Certain problems have arisen in connection with the operation of very heavy aircraft such as four-motor bombers, and other heavy aircraft, because of the momentary heavy loads placed upon the main inverter and the batteries carried

2 by such aircraft. It has been found, for example, that the initial heavy load employed on opening bomb-bay doors causes such a current drain on the main inverter that the spare inverter has been cut into the system. It has also been found that in certain instances, a heavy drain on the battery has slowed the main inverter to such an extent as to cause the change-over relay to cut in the spare inverter. The importance of such occurrences can be readily appreciated when it is understood that the pilot or the flight engineer will believe from the showing of his instruments that the main inverter has failed. This may lead to a change of plans or the interruption of a flight mission as well as other complications readily apparent to those familiar with the operation of very heavy aircraft.

The primary object of the present invention is therefore to provide an automatically-controlled inverter change-over system which will solve the problem and avoid the cutting in of the spare inverter when in fact the main inverter has not failed or been put out of action.

A further object of the invention is to provide a system such as that referred to in which a momentary failure of the main inverter or its slowing down momentarily, is insufficient to operate the relay system to cut in the spare inverter.

According to the present invention, the automatic control change-over relay system includes a time-delay relay, an A. C. relay, and a D. C. relay, as in the case of the system disclosed in the above-mentioned application, but these relays are interconnected by distinctly different circuits to accomplish the features and objects of the present invention. The various relays are connected in such a way that when the pilot closes his main switch to start the main inverter, it, and not the spare inverter is energized. Furthermore, the circuits connecting the various relays of the system are arranged so that a momentary interruption, or drain on the main inverter or on the D. C. current, does not cut in the spare inverter, but sets up a circuit which would eventually cut in the spare inverter if an interruption or drain continues beyond a predetermined time.

An important feature of the present invention is the provision of a circuit which, upon the closing of the pilot switch, establishes a substantially direct line for the starting of the main inverter and closes a circuit to the time-delay relay. The connections to the output of the main inverter, however, are such that prior to the operation of the time-delay relay at this stage, the A. C. relay opens a switch in the circuit to the time-delay relay, thereby preventing the cutting in of the spare inverter.

Another important feature of the present invention is the provision of means whereby the A. C. relay keeps the switch open to the time-delay relay. However, the arrangement is such that this switch may close, upon a momentary failure of A. C. current or when the current partially fades out. The time-delay relay is then started, but it is set so that it will not cut in the spare inverter in a period of less than two seconds. The arrangement is such that a revival of the main inverter, in a period of no more than five seconds, opens the switch to the time-delay relay and prevents the cutting in of the spare inverter.

Another important feature of the present invention is the arrangement of a circuit for cutting in the spare inverter upon the failure of the A. C. current for a predetermined time and the resulting de-energizing of the A. C. relay. The occurrences of these events energize the time-delay relay which in turn energizes the D. C. relay which operates a switch to cut in the spare inverter and to cut out the heater or operator of the time-delay relay.

Other features, objects and advantages of the present invention will be described in greater detail in the following description in conjunction with the accompanying drawing illustrating one form of the improved automatic change-over system.

In the drawing, the single figure is a schematic wiring diagram showing the preferred arrangement of the various elements of the system and circuit, and its association with the circuits of the main and spare inverters used for supplying alternating current.

Referring to the drawing, the improved automatically controlled inverter change-over system and circuit is shown in conjunction with D. C. power relays for initiating the operation of main and spare inverters, as also shown in the pending application. The control system per se is illustrated primarily in a rectangular enclosure 10 centrally located in the figure of the drawing. D. C. current, as for example, from batteries, is supplied to the apparatus through a feeder bar 12. As in the application referred to above, the apparatus illustrated includes a main inverter or motor generator 14, a D. C. power relay 16 of conventional design for the main inverter 14, a spare inverter 18, a D. C. relay 20 like the relay 16, for the spare inverter, an inverter-failure-indicating signal 22, and a relay 23 therefor.

Direct current for operating the inverters 14 and 18, as well as the alternating current generated by the inverters, are supplied through the separate relays 16 and 20 which are operated from the automatic system included in the closure 10. The D. C. current, for example, such as 29 volts current, is supplied from batteries or other sources through the feeder bar 12 and leads 24, through the relays 16 and 20, to the inverters 14 and 18. The 115 volt, 400 cycle alternating current generated by the inverters 14 and 18 is conducted through feeder lines 26, and 29 volt D. C. or 115 volt A. C. current may be conducted through parallel feeder lines 28. The three switches in each of the D. C. power relays 16 and 20 remain open until they are closed when these relays are energized to supply D. C. current to either of the inverters 14 or 18 through line 24, and deliver the generated alternating current into the main A. C. feeder lines 26 and 28.

According to the present invention, D. C. current is supplied from the feeder bar 12 to the change-over relay system through a lead 30 provided with a main or pilot switch 32 which is connected to a terminal 34 of the change-over unit shown in the enclosure 10. The various leads, such as 24 and 30, from the D. C. feeder bar 12, are provided with fuses 35. The closing of the pilot switch 32 establishes a 29 volt D. C. circuit from the feeder bar 12 through the terminal 34, a line 36, a normally closed switch 38, comprising a part of a D. C. relay 40, a line 42, a terminal 44 and a line 46, connecting into the coils of the D. C. power relay 16. The coils of the relay 16 are grounded as indicated, and the flow of current through the line 46 closes the three switches in the relay and therefore supplies 29 volt D. C. current through the line 24, through this relay, to the inverter 14 which is immediately put in operation.

D. C. current supplied through the terminal 34 also passes through a line 48, an initially closed switch 50 of an A. C. relay 52, a line 54 which leads to a thermostatic bimetal contact switch arm 56 comprising a part of a heater-operated time-delay relay 58. The line 54 has a branch line 60 leading through an initially closed switch 62, operated by the D. C. relay 40. The switch 62 is initially closed with a line 64 connected into a heating element 66 of the heater-operated time-delay relay 58. The outlet of the heating element 66 leads to a ground line 68 and a terminal 70 which is connected to ground as shown.

As soon as the inverter 14 is placed in operation and alternating current builds up in the line 26, this current is conducted through a connecting line 72, through a terminal 74 in the enclosure 10, and a line 76 to the coil of the A. C. relay 54, which is connected to the ground line 68. The energizing of the relay 52 occurs immediately upon the production of A. C. current in the system, and therefore opens the switch 50 and cuts off the D. C. current initially flowing to the time-delay relay 58 through the lines 54 and 60, before the closing of the time-delay relay switch.

The continuous flow of alternating current from the main inverter 14 through the lines 72 and 76 and the relay 52, maintains the switch 50 open, otherwise the switch is biased to a closed position and is therefore set for closure upon the failure, or reduction, of the A. C. current supplied to the relay 52. The interruption of the flow of current through the relay 52 permits the switch 50 to close and thereby effect a circuit through the heater of the relay 58 which begins the heating of the bimetal of the switch 56. If the interruption of current to the relay 52 is only a momentary matter, this relay will be re-energized and reopen the switch 50 prior to the closing of the switch 56. Under these conditions, therefore, there would be no change from the main inverter to the spare inverter.

The nature of these momentary interruptions and reductions in the flow of A. C. current have been explained above. Under certain circumstances, however, the main inverter 14 may actually fail or be knocked out by enemy action, and when this happens, the switch 50 closes and supplies current to the relay 58 to close the switch 56. The instant the switch 56 closes, two things happen: (1) A circuit is established through a line 78, a line 80 leading to a terminal 82, and a line 84, to the coils of the D. C. power relay 20, which starts the operation of the spare inverter 18 to supply A. C. current. (2) At the same time a circuit is established from the switch 56 through the line 78 and a connecting line 86, through the coil of the relay 40, which is grounded to the ground line 68.

When the relay 40 is energized in this manner, the switch 62 is opened, thereby cutting the current to the heater 66, and the lever of switch 38 is swung to de-energize relay 16 and to connect with a line 88, which in turn connects into the lines 86 and 80 to provide for the direct supply of D. C. current from the terminal 34 to the relays 20 and 40. After the spare inverter 18 has been cut into the system in the manner described, and the relay 16 de-energized, no alternating current is passing through the relay 52. The switch 50 remains closed to supply current through the switch 56 to the relay 40 until the relay cools and the switch 56 opens. The opening of the switch 56 will merely cut off the flow of current through the line 54 to the relays 20 and 40, but these relays are now supplied with current directly from the terminal 34 through the switch 38 and line 88.

The time-delay relay 58 is arranged so that the heating is sufficiently slow to prevent the closing of the switch in a period of less than 2 seconds, and in any event it must close in no more than 5 seconds. This will allow for any temporary interruption in the alternating current from the main inverter without causing a change-over from the main to the spare inverter. The heater relay is also preferably constructed so that it will cool rapidly after being de-energized, so that the plane can be tested quickly. If the main inverter 14 is inoperative or out of commission at the time of the closing of the pilot switch 32, the relay 52 will not be energized, but the time-delay relay 58 will be energized to cut in the spare inverter 18 and operate the relay 40 to establish permanent circuits to the relays 20 and 40, and to cut out the heater or other operator of the time-delay relay 58.

The signal relay 23 is provided to indicate failure in the supply of A. C. current. D. C. is conducted to this relay from the feeder bar 12 through a line 90 while a lead 92 connects into the A. C. line 26. The relay 23 is grounded, as indicated, and connected by a line 94 to the signal 22 which is also grounded. When the alternating current in the line 26 is interrupted, the relay 23 is de-energized to cut off the supply of direct current to the signal 22.

The relays 16 and 20 are standard D. C. power relays, and certain of the elements within the enclosure 10 are also standard. Different relays may be employed than those indicated within the enclosure 10, so long as they are adapted to carry out the functions and objects of the present invention. The heater-operated time-delay relay or switch is merely one example of a time-delay relay which might be used to establish the circuits as described at the prescribed periods of time in the cycle of operations. Various other modifications may be made in the apparatus without departing from the spirit and scope of the present invention, as defined by the claims.

What I claim is:

1. An automatically controlled inverter change-over relay system for supplying alternating current from a spare inverter following the failure of a main inverter for producing alternating current, comprising an alternating current relay having an initially closed switch, a direct current relay having a normally open switch and two normally closed switches, a time-delay heater-operated relay for closing a switch which is normally open, a source of direct current for said relay system, means for establishing a direct current circuit through one of the closed switches of said D. C. relay to means for starting the main inverter for generating alternating current, means for simultaneously establishing a direct current circuit through the heater of the time-delay relay, means for establishing an alternating current circuit from the current output of the main inverter through the alternating current relay for opening the switch associated therewith, means whereby said heater-operated relay establishes a circuit for energizing the D. C. relay to open said closed switches and close the normally open switch to establish a circuit from the direct current source to means for starting the spare inverter, the energizing of said D. C. relay also opening the circuit through the heater of the time-delay relay.

2. An automatic electrical relay unit for supplying alternating current from a spare inverter following the failure of a main inverter for producing alternating current, comprising an alternating current relay and a switch opened thereby, a D. C. relay having a normally open switch and two normally closed switches, a time-delay relay having a switch which is normally open, a source of direct current for said relay unit, means for establishing a direct current circuit through one of the closed switches of said D. C. relay to means for starting the main inverter, means for simultaneously initiating the establishment of a direct current circuit through the time-delay relay, means for establishing an alternating current circuit from the current output of the main inverter through the alternating current relay for opening the switch associated therewith, means whereby said time-delay relay is adapted to establish a circuit for energizing the D. C. relay to open said closed switches and close the normally open switch to establish a circuit from the direct current source to means for starting the spare inverter and to establish a circuit for keeping the D. C. relay energized.

3. An automatic electrical relay unit for supplying alternating current from a spare inverter following the failure of a main inverter for producing alternating current, comprising an alternating current relay and a switch opened thereby, a D. C. relay having a normally open switch and two normally closed switches, a time-delay relay having a switch which is normally open, a source of direct current for said relay unit, means for establishing a direct current circuit through one of the closed switches of said D. C. relay to means for starting the main inverter, means for simultaneously initiating the establishment of a direct current circuit through the time-delay relay, means for establishing an alternating current circuit from the current output of the main inverter through the alternating current relay for opening the switch associated therewith, means including the time-delay relay operative after a predetermined time following the failure of the main inverter for starting the spare inverter and for establishing a circuit for energizing the D. C. relay to thereby open said closed switches and close the normally open switch to thereby establish a circuit from the direct current source to the means for starting the spare inverter and to establish a circuit for keeping the D. C. relay energized.

4. In an automatic inverter change-over system for supplying current from a spare inverter following the failure of a main inverter normally used for supplying such current, a relay, a heat-responsive switch provided with an electric heater operable by current flow therethrough to cause the operation of said switch after the passage of current through the heater for a predetermined period of time, means for energizing said relay through said switch and for thereby establishing a circuit to the spare inverter, a circuit including a switch for supplying current to said heat-responsive switch, means responsive to the current generated by said main inverter for opening the switch in said last-mentioned circuit, and means responsive to the failure of the main inverter for closing said last-mentioned switch to thereby operate said heat-responsive switch and initiate the operation of the spare inverter after a predetermined time.

5. In an automatic inverter change-over system for supplying current from a spare inverter following the failure of a main inverter normally used for supplying such current, a relay, a time-delay switch operable by current flow thereto to cause the closing of said switch after the passage of current thereto for a predetermined period of time, means for starting the spare inverter and for energizing said relay upon the closing of said switch, said relay being adapted to establish a circuit for the operation of the spare inverter, a circuit including a switch for supplying current to said time-delay switch, means responsive to the current generated by said main inverter for opening the switch in said last-mentioned circuit, said last-mentioned switch being biased to a closed position whereby the failure of the main inverter causes said last-mentioned switch to close thereby supplying current to said time-delay switch to cause it to close and start the operation of the spare inverter.

6. In an automatic change-over system for supplying current from a spare current source upon the failure of current normally supplied from a main current source, a relay, a current-operated time-delay switch operable by the flow of current thereto to cause the closing of said switch after the passage of current thereto for a predetermined period of time, circuit means for energizing said relay and for initiating the supply of current from said spare current source upon the closing of said switch, said relay being adapted to establish a circuit for the supply of current from said spare current source, a circuit including a switch for supplying current to said time-delay switch, and means responsive to the flow of current from said main current source for opening the switch in said last-mentioned circuit, said last-mentioned switch being normally biased to a closed position whereby the failure of current supplied from said main current source permits said last-mentioned switch to close to in turn permit current to flow therethrough to said time-delay switch.

MALCOLM K. PARKHURST.